United States Patent
Lee et al.

(10) Patent No.: US 9,389,479 B2
(45) Date of Patent: Jul. 12, 2016

(54) ELECTROCHROMIC DEVICE

(71) Applicant: SAMSUNG ELECTRONICS CO., LTD., Suwon-si (KR)

(72) Inventors: Cho-Young Lee, Yongin-si (KR); Do-Won Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 14/706,047

(22) Filed: May 7, 2015

(65) Prior Publication Data

US 2016/0026058 A1   Jan. 28, 2016

(30) Foreign Application Priority Data

Jul. 22, 2014  (KR) .................. 10-2014-0092266

(51) Int. Cl.
  *G02F 1/153*  (2006.01)
  *G02F 1/15*  (2006.01)

(52) U.S. Cl.
  CPC ............ *G02F 1/1525* (2013.01); *G02F 1/1533* (2013.01); *G02F 1/1523* (2013.01); *G02F 2001/1519* (2013.01)

(58) Field of Classification Search
  CPC .......................... G02F 1/1523; G02F 1/1533
  USPC ................... 359/265–275; 345/105
  See application file for complete search history.

(56) References Cited

U.S. PATENT DOCUMENTS

| | | | |
|---|---|---|---|
| 6,515,787 B1 * | 2/2003 | Westfall ............. | G02F 1/1523 359/265 |
| 8,284,472 B2 * | 10/2012 | Yoshimura .......... | G02F 1/13454 359/267 |
| 2002/0044717 A1 | 4/2002 | Richardson | |
| 2007/0076288 A1 | 4/2007 | Yoshimura et al. | |
| 2010/0188726 A1 | 7/2010 | Yoshimura et al. | |

* cited by examiner

Primary Examiner — Tuyen Tra
(74) Attorney, Agent, or Firm — Sughrue Mion, PLLC

(57) ABSTRACT

Disclosed herein is an electrochromic device having a structure in which atoms of an electrolytic layer and an ion storage layer are mixed with each other. The electrochromic device includes an active layer configured to provide a transparent state by a protonation and a reflective state by a deprotonation, an ion storage layer which stores a proton, an electrolytic layer which is provided between the active layer and the ion storage layer and used a medium through which the proton is moved, and a mixed layer having constituent elements of the ion storage layer and the electrolytic layer.

20 Claims, 16 Drawing Sheets

ELECTROCHROMIC DEVICE

CROSS-REFERENCE TO RELATED APPLICATION

This application claims priority from Korean Patent Application No. 10-2014-0092266, filed on Jul. 22, 2014 in the Korean Intellectual Property Office, the disclosure of which is incorporated herein by reference in its entirety.

BACKGROUND

1. Field

Apparatuses and methods consistent with exemplary embodiments relate to an electrochromic device that is excellent in durability when repeatedly switching between a transparent state and a reflective state.

2. Description of the Related Art

Devices that switch between a light transmissive mode and a light reflective mode when a voltage is applied to the devices may be referred to as reflective type electrochromic devices (ECDs).

Generally, a reflective type ECD includes a stacked structure that includes a transparent substrate, a transparent electrode, an ion storage layer, an electrolytic layer, a catalyst layer, and an active layer.

The ion storage layer may be made of a transition metal oxide, and protons (in general, hydrogen ions) stored in the ion storage layer move toward the active layer when a voltage is applied.

The active layer has an optical characteristic which is switched from a reflective state to a transmissive state according to movement of the protons. Meanwhile, when a reverse voltage is applied, the protons move to the ion storage layer which is an original position, and the optical characteristic of the active layer is switched back to the reflective state again. As described above, while reversible oxidation-reduction reaction occurs, the optical characteristic is switched between the transmissive mode and the reflective mode.

In order to increase transmission in the transmissive mode, the amount of stored protons should be large, and in order to increase the amount of stored protons, a thickness of the ion storage layer is usually increased. However, when the thickness of the ion storage layer is increased, time at which proton ions are ejected from the ion storage layer is relatively increased and a whole switching speed of the device is reduced.

SUMMARY

An aspect of one or more exemplary embodiments is to provide an electrochromic device having a structure in which atoms of an electrolytic layer and an ion storage layer are mixed with each other.

Additional aspects of exemplary embodiments will, in part, be obvious from the following description, or may be learned by practice.

According to an aspect of an exemplary embodiment, there is provided an electrochromic device including an active layer configured to provide a transparent state by a protonation and a reflective state by a deprotonation, an ion storage layer which stores a proton, an electrolytic layer which is provided between the active layer and the ion storage layer and configured to be a medium through which the proton is moved, and a mixed layer comprising a constituent element of the ion storage layer and a constituent element of the electrolytic layer.

The mixed layer may be provided between the ion storage layer and the electrolytic layer.

The mixed layer may comprise a uniform mix of the constituent elements of the ion storage layer and the electrolytic layer.

The mixed layer may have a structure in which the constituent element of the ion storage layer permeates into the electrolytic layer.

The mixed layer may have a structure in which the constituent element of the electrolytic layer permeates into the ion storage layer.

The mixed layer may be configured to have a thickness in a range between 10 percent and 50 percent of a total thickness of the ion storage layer, the mixed layer, and the electrolytic layer.

The mixed layer may be formed using at least one method selected from a group consisting of a sputtering method and an annealing method.

The active layer may include a magnesium (Mg) alloy material.

The ion storage layer may include at least one selected from a group consisting of tungsten oxide ($WO_3$), molybdenum oxide ($MoO_3$), vanadium oxide ($V_2O_3$), and titanium oxide ($TiO_2$).

The electrolytic layer may include at least one selected from a group consisting of tantalum oxide ($Ta_2O_5$), zirconium oxide ($ZrO_2$), and niobium oxide ($Nb_2O_5$).

The proton may include at least one selected from a group consisting of hydrogen (H), lithium (Li), and sodium (Na).

According to an aspect of another exemplary embodiment, there is provided an electrochromic device including an active layer configured to provide a transparent state by a protonation and a reflective state by a deprotonation, an ion storage layer which stores a proton, and an electrolytic layer which is provided between the active layer and the ion storage layer and configured to be a medium through which the proton is moved, and the ion storage layer includes a constituent element of the electrolytic layer, or the electrolytic layer includes a constituent element of the ion storage layer.

The device may include a structure in which the constituent element of the electrolytic layer permeates into the ion storage layer.

The device may include a structure in which the constituent element of the ion storage layer permeates into the electrolytic layer.

The device may include a structure in which the constituent elements of the ion storage layer and the electrolytic layer are uniformly mixed with each other.

According to an aspect of another exemplary embodiment, there is provided an electrochromic device including an electrode; an active layer composed of an alloy; an electrolytic layer comprising a first element; an ion storage layer composed of a transition metal oxide comprising a second element; and a mixed layer disposed between the active layer and the ion storage layer comprising the first element and the second element, wherein the electrochromic device switches between transmissive mode and a reflective according to voltages applied to the active layer and the electrode.

The mixed layer may comprise a higher concentration of the first element than the second element.

The mixed layer may comprise a higher concentration of the second element than the first element.

The first element may comprise tantalum and the second element may comprise tungsten.

The electrolytic layer and the ion storage layer may have a substantially same thickness.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Since the one or more exemplary embodiments described in this specification and configurations illustrated in drawings are only exemplary, it is understood that the disclosure covers various equivalents, modifications, and substitutions at the time of filing of this application. Hereinafter, an electrochromic device (ECD) according to one or more exemplary embodiments will be described in detail with reference to the accompanying drawings.

The ECD is a device in which an optical characteristic is reversibly switched when a voltage is applied to the device, and an ECD in which constituent elements are mixed with each other and distributed on an interface between an ion storage layer and an electrolytic layer of the ECD is provided in this specification.

Hereinafter, a basic configuration and an operation of the ECD will be described, and one or more exemplary embodiments will be described.

Figure 1:
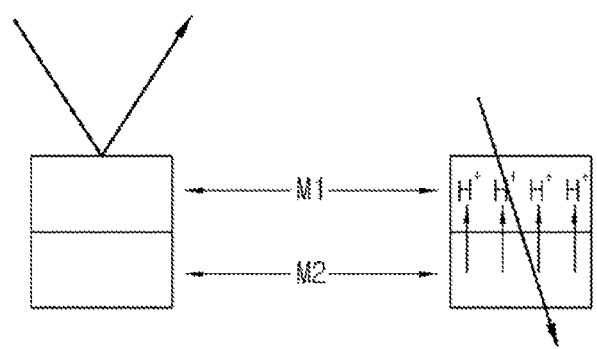
FIG. 1 is a view illustrating a basic configuration of an electrochromic device according to an exemplary embodiment.

FIG. 1 is a view illustrating a basic configuration of the ECD according to an exemplary embodiment, and FIGS. 2A to 2D are views illustrating an operating process of the ECD.

Referring to FIG. 1, the ECD includes a structure in which an active layer M1 and an ion storage layer M2 are stacked, and a light reflection rate of the active layer M1 is changed in response to an external stimulus.

The active layer M1 may include an illumination material in which an optical characteristic is changed according to a concentration of a specific element. For example, a magnesium (Mg) alloy material may be used as the illumination material, and the device may implement a reflective mode or a transparent mode according to a concentration of hydrogen ions ($H^+$) when using the magnesium alloy material.

For example, when the concentration of hydrogen ions ($H^+$) in the active layer M1 is low as an initial equilibrium state of the ECD, a reflective mode that shows a metallic color by reflecting incident light may be implemented when the magnesium alloy material is used. When a power source is applied to the ECD and the hydrogen ions ($H^+$) flow into the active layer M1, the flowing hydrogen ions ($H^+$) may be coupled to the magnesium alloy material, and the magnesium alloy material coupled to the hydrogen ions ($H^+$) may have high transmission and thus may enable a transparent mode.

The ion storage layer M2 may include a material (hereinafter referred to as a conversion material) capable of containing a proton such as hydrogen. The conversion material may inject/release electric charge electrons or positive holes or may release or absorb protons according to an external stimulus such as light irradiation.

The ECD may implement a transparent mode or a reflective mode through exemplary processes illustrated in FIGS. 2A to 2D.

Hereinafter, a process of implementing the transparent mode or the reflective mode using hydrogen ions ($H^+$) as a medium will be described. All of the active layer M1 and the ion storage layer M2 may have a characteristic of absorbing/releasing hydrogen and at the same time may have electrical conductivity capable of moving electric charges (electrons or positive holes) and the hydrogen ions ($H^+$).

Figure 2A:
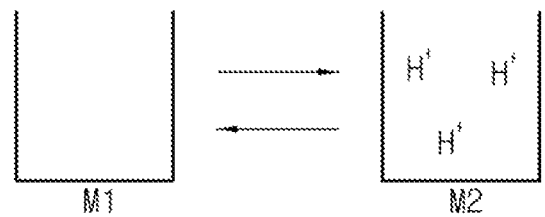
FIGS. 2A to 2D are views illustrating an operating process of an electrochromic device according to an exemplary embodiment.

FIG. 2A is a view illustrating initial states of the active layer M1 and the ion storage layer M2 shown in FIG. 1. As shown in FIG. 2A, the active layer M1 that does not substantially store hydrogen ions ($H^+$) and the ion storage layer M2 that stores hydrogen ions ($H^+$) are present in an equilibrium state with each other. In this case, since the active layer M1 does not have hydrogen of a sufficient concentration, the active layer M1 reflects light, and thus implements an original metallic luster.

Figure 2B:
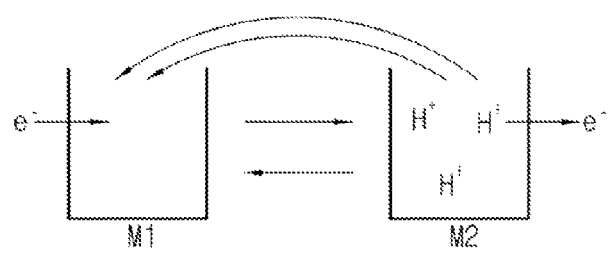

FIG. 2B is a view illustrating a result in which a negative potential is provided to the active layer M1 shown in FIG. 2A and a positive potential is provided to the ion storage layer M2.

As shown in FIG. 2B, when the negative potential is provided to the active layer M1 and the positive potential is provided to the ion storage layer M2, electrons flow into the active layer M1 and the active layer M1 is in an electron-rich state, and electrons leak from the ion storage layer M2 and at the same time positive holes are injected into the ion storage layer M2.

The positive holes injected into the ion storage layer M2 move from the ion storage layer M2 to the active layer M1. That is, the ion storage layer M2 is in a state in which hydrogen ions ($H^+$) are easily released, and meanwhile the amount of the hydrogen ions ($H^+$) flowing from the ion storage layer M2 is increased in the active layer M1 and thus the active layer M1 contains a large amount of hydrogen ions ($H^+$).

Figure 2C:
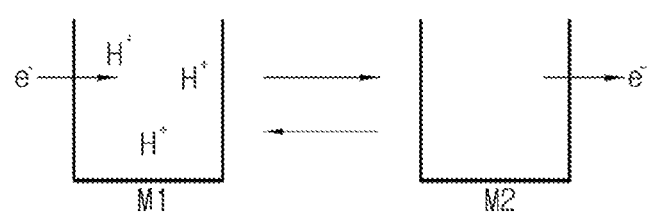

Because of this, a hydrogen ion ($H^+$) equilibrium state established between the active layer M1 and the ion storage layer M2 is broken, the active layer M1 is in a state in which hydrogen is easily contained, and the hydrogen ions ($H^+$) released from the ion storage layer M2 move to the active layer M1. Therefore, as shown in FIG. 2C, a new equilibrium state is formed, the hydrogen ions ($H^+$) moved to the active layer M1 and an illumination material are coupled in this state, and thus the active layer M1 becomes transparent.

In summary, the above-described reaction may be represented by $M1+M2(H) \rightarrow M1(H)+M2$. Here, M1(H) and M2(H) show a state in which hydrogen is coupled to the active layer M1 and a state in which hydrogen is coupled to the ion storage layer M2, respectively. As described above, hydrogen ions (H$^+$) are only exchanged between the active layer M1 and the ion storage layer M2, and thus a reaction in which other ions are involved does not occur.

Figure 2D:
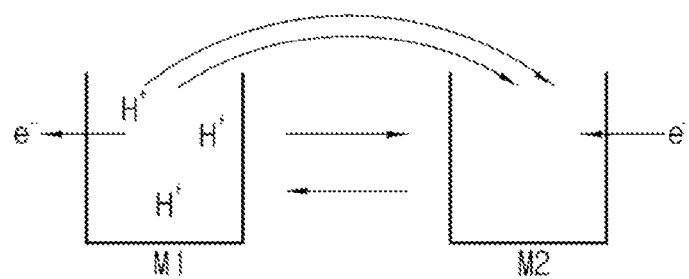

Then, as shown in FIG. 2D, since the reaction proceeds in a reverse direction when polarity of the applied voltage is reversed, it returns to the original equilibrium state shown in 2A.

More specifically, when a negative potential is provided to the ion storage layer M2 and a positive potential is provided to the active layer M1, electrons flow into the ion storage layer M2 and thus the ion storage layer M2 are in an electron-rich state. Meanwhile, electrons leak from the active layer M1 and at the same time positive holes are injected into the active layer M1.

The positive holes injected into the active layer M1 move from the active layer M1 to the ion storage layer M2. That is, the active layer M1 is in a state in which the hydrogen ions (H$^+$) are easily released, and meanwhile the amount of the hydrogen ions (H$^+$) flowing from the active layer M1 is increased in the ion storage layer M2 and thus the ion storage layer M2 contains a large amount of hydrogen ions (H$^+$).

Because of this, the new equilibrium state established between the active layer M1 and the ion storage layer M2 is broken, the ion storage layer M2 is in a state in which hydrogen is easily contained, and the hydrogen ions (H$^+$) released from the active layer M1 move to the ion storage layer M2. Therefore, as shown in FIG. 2D, since it returns to the original equilibrium state and the active layer M1 does not have hydrogen of a sufficient concentration, the active layer M1 shows the original metallic luster.

The basic configuration and the operation principle of the ECD have been described above.

Hereinafter, an exemplary embodiment of the ECD will be described in more detail with reference to the accompanying drawings.

Figure 3:
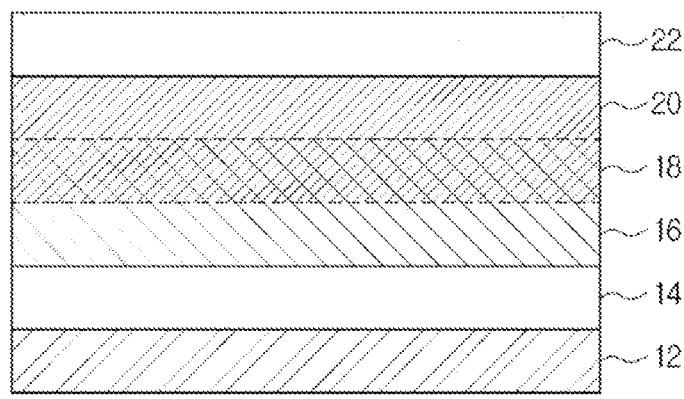
FIG. 3 is a view illustrating a configuration of an electrochromic device according to an exemplary embodiment.

FIG. 3 is a view illustrating a configuration of an ECD 10 in accordance with an exemplary embodiment.

As shown in FIG. 3, the ECD 10 in accordance with an exemplary embodiment includes a substrate 12, an electrode 14 provided on the substrate 12, an ion storage layer 16 provided on the electrode 14, an electrolytic layer 20 provided on the ion storage layer 16, an active layer 22 provided on the electrolytic layer 20, and a mixed layer 18 which is provided on an interface between the ion storage layer 16 and the electrolytic layer 20 and has a structure in which constituent elements of the ion storage layer 16 and the electrolytic layer 20 are mixed with each other.

The substrate 12 may be provided so as to support the electrode 14, the ion storage layer 16, the mixed layer 18, the electrolytic layer 20, and the active layer 22, and may be made of a transparent material.

The electrode 14 may be made of a transparent material. For example, it may be made of an indium tin oxide (ITO) material.

The ion storage layer 16 may contain protons. The protons are particles that form an atomic nucleus and form various nuclei with neutrons. The protons are generally hydrogen ions (H$^+$), and may include lithium ions (Li$^+$) and sodium ions (Na$^+$). Next, as an example, the ion storage layer 16 including hydrogen ions (H$^+$) will be described.

The ion storage layer 16 may include a conversion material capable of containing the hydrogen ions (H$^+$), and the conversion material may include a transition metal oxide capable of light transmission and light absorption. For example, the ion storage layer 16 may include at least one selected from a group consisting of tungsten oxide (WO$_3$), molybdenum oxide (MoO$_3$), vanadium oxide (V$_2$O$_3$), and titanium oxide (TiO$_2$).

The ion storage layer 16 may receive electrons from the electrode and release/absorb the hydrogen ions (H$^+$) using the above-described conversion material. For example, tungsten oxide (WO$_3$) may be present as tungsten oxides with hydrogen (H$_x$WO$_3$) by absorbing the hydrogen ions (H$^+$), and may be present as tungsten oxide (WO$_3$) by releasing the hydrogen ions (H$^+$).

Meanwhile, as described above, the transparent state of the ECD 10 is implemented by coupling the hydrogen ions (H$^+$) which flow into the active layer 22 to a magnesium alloy material included in the active layer 22, and thus the amount of stored hydrogen ions (H$^+$) should be generally large in order to increase transmission of the ECD 10. Therefore, the amount of stored hydrogen ions (H$^+$) inside the device may be adjusted by adjusting a thickness of the ion storage layer 16.

The ion storage layer 16 may include an electrically conductive material in addition to the conversion material. When the electrically conductive material is included in the ion storage layer 16, ion exchange between the active layer 22 and the ion storage layer 16 may be quickly performed. A material that may perform ion conduction, such as a liquid or solid electrolyte, a conductive polymer material that conducts electric charges (electrons or positive holes), or the like may be used as the electrically conductive material.

The ion storage layer 16 may include a coupling material such as a binder resin, in addition to the above-described conversion material or the above-described electrically conductive material as required.

The mixed layer 18 may be provided on the interface between the ion storage layer 16 and the electrolytic layer 20, and may have a structure in which constituent elements of the ion storage layer 16 and the electrolytic layer 20 are mixed with each other.

As described above, the amount of stored hydrogen ions (H$^+$) in the ECD 10 should be large in order to increase transmission of the ECD 10 in a transparent mode, and the thickness of the ion storage layer 16 may be adjusted in order to increase the amount of stored hydrogen ions (H$^+$). However, since the time at which the hydrogen ions (H$^+$) are ejected from the ion storage layer 16 is relatively increased when the thickness of the ion storage layer 16 is increased, a switching speed of the device is reduced.

Therefore, in order to increase the amount of stored hydrogen ions (H$^+$), the mixed layer 18 is provided on the interface between the ion storage layer 16 and the electrolytic layer 20 in addition to an increase of the thickness of the ion storage layer 16. The mixed layer 18 has a structure, in which constituent elements of the ion storage layer 16 and the electrolytic layer 20 are mixed with each other, and thus the amount of stored hydrogen ions (H$^+$) is increased and at the same time the switching speed of the device may be increased. The mixed layer 18 will be described in detail below.

The electrolytic layer 20 is provided between the ion storage layer 16 and the active layer 22, and is used as a medium through which protons are moved so that ion exchange between the ion storage layer 16 and the active layer 22 is smoothly performed. Since the movement of the hydrogen ions (H$^+$) is easy using the electrolytic layer 20 as a medium when the electrolytic layer 20 is disposed between the ion storage layer 16 and the active layer 22, the switching speed of the ECD 10 may be improved.

The electrolytic layer 20 may be provided in a liquid state, a gel state, or a solid state, and may include at least one selected from a group consisting of tantalum oxide ($Ta_2O_5$), zirconium oxide ($ZrO_2$), and niobium oxide ($Nb_2O_5$).

The ECD 10 may also include a layer including a conductive polymer material instead of or in addition to the electrolytic layer 20. Since the conductive polymer material is doped with ion for providing conductivity, the conductive polymer material may perform a function of the electrolytic layer 20.

The active layer 22 may include an illumination material in which an optical characteristic is changed according to the concentration of hydrogen ions ($H^+$), and all or a part of the active layer 22 may be formed of the illumination material of a single layer or a multi-layer. More specifically, the active layer 22 may include a magnesium alloy material, and the magnesium alloy material may adjust an atomic ratio of magnesium and an alloy material.

The ECD 10 may also include a catalytic material in order to accelerate an oxidation-reduction reaction speed of the active layer 22.

The catalytic material may be processed in a form of a layer and may be disposed between the active layer 22 and the electrolytic layer 20, or may be processed in a form of powder, in a form of particle, or in a form of island and uniformly distributed inside the active layer 22 or disposed on the interface between the active layer 22 and the electrolytic layer 20.

The catalytic material may include at least one selected from a group consisting of platinum (Pt), palladium (Pd), silver (Ag), and gold (Au).

The ECD 10 may further include a buffer layer between the electrolytic layer 20 and the active layer 22 so as to prevent oxidation of a metal component included in the active layer 22.

Above, the configuration of the ECD 10 in accordance with an exemplary embodiment was described.

Next, a mixed layer 18 of the configuration of the ECD 10 will be described in more detail.

Figure 4:
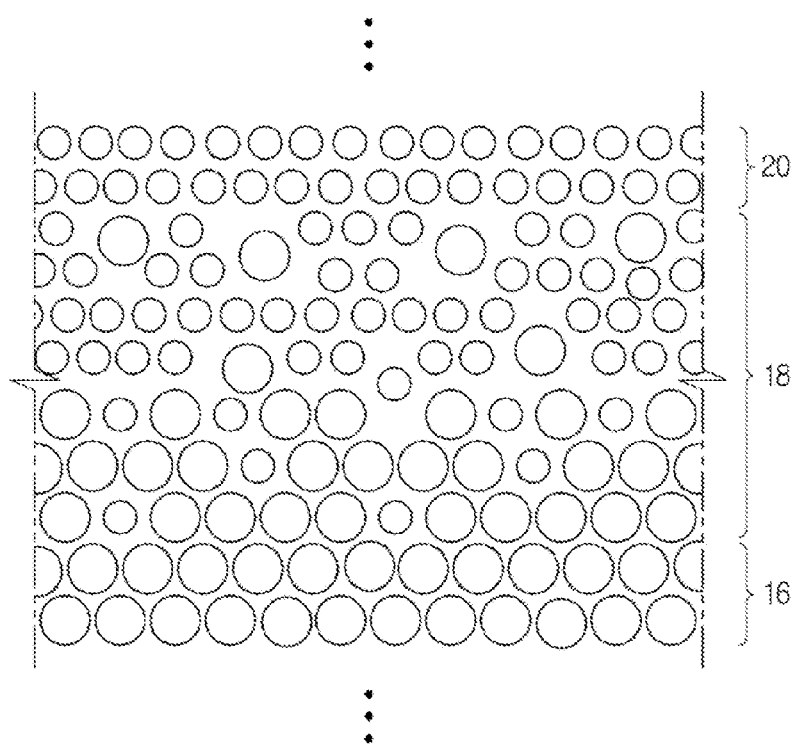
FIG. 4 is a view illustrating an example of a mixed layer formed on an interface between an ion storage layer and an electrolytic layer of an electrochromic device of FIG. 3.
Figure 5:
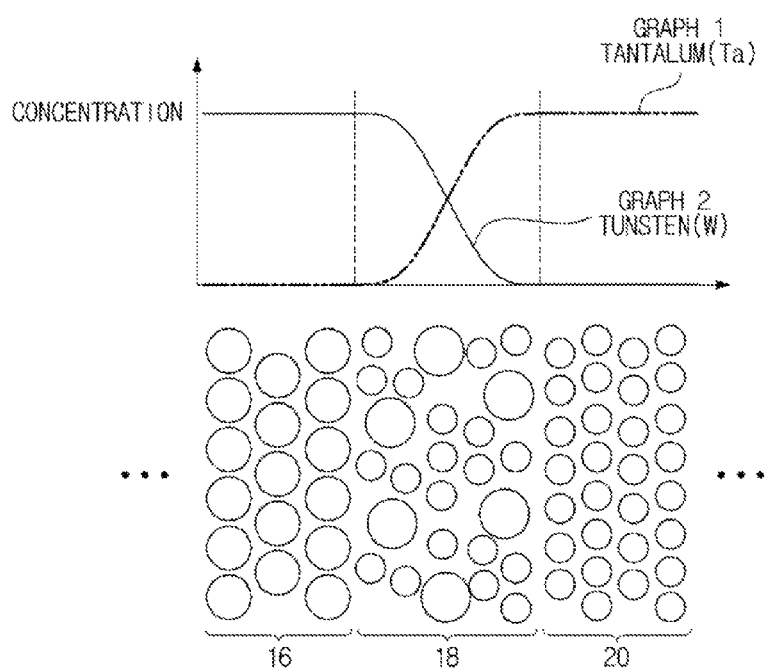
FIG. 5 is a view illustrating concentrations of elements that form each layer of an electrochromic device of FIG. 4.

FIG. 4 is a view illustrating an example of the mixed layer 18 formed on the interface between the ion storage layer 16 and the electrolytic layer 20 of the ECD 10 shown in FIG. 3, and FIG. 5 is a view illustrating a change of concentrations of elements that form each layer of the ECD 10 shown in FIG. 4.

Referring to FIG. 4, the mixed layer 18 may have a structure in which the constituent elements of the ion storage layer 16 and the electrolytic layer 20 are mixed with each other, and may be formed to have a thickness in a range of 10 to 50 percent of a total thickness of the ion storage layer 16, the mixed layer 18, and the electrolytic layer 20. As an example, the ion storage layer 16 including tungsten oxide ($WO_3$) as a main constituent element and the electrolytic layer 20 including tantalum oxide ($Ta_2O_5$) as a main constituent element will now be described.

The constituent elements of the ion storage layer 16 and the electrolytic layer 20 may be uniformly distributed in the mixed layer 18. For example, tungsten oxide ($WO_3$) and tantalum oxide ($Ta_2O_5$) may be present by being mixed with each other and distributed.

The tantalum oxide ($Ta_2O_5$) and the tungsten oxide ($WO_3$) included in the mixed layer 18 may have different thicknesses, and thus may be mixed with each other and may have a space formed therein. Thus, the tungsten oxide ($WO_3$) included in the mixed layer 18 may be distributed to have a lower density than the tungsten oxide ($WO_3$) included in the ion storage layer 16, and thus a movement path of the hydrogen ions ($H^+$) may be ensured.

Further, as the tungsten oxide ($WO_3$) may be distributed in the mixed layer 18 in addition to the ion storage layer 16, a distribution area of the tungsten oxide ($WO_3$) may extend. Since the tungsten oxide ($WO_3$) may serve to store the hydrogen ions ($H^+$), the distribution area of the tungsten oxide ($WO_3$) extends and thus hydrogen ion ($H^+$) storage capability of the device may be improved. Therefore, since the content of the hydrogen ions ($H^+$) capable of coupling to the active layer 22 is increased, transmission of the ECD 10 may be improved.

Referring to FIG. 5, the concentration changes of elements that configure each layer in the ECD 10 is as follows. A horizontal axis of FIG. 5 sequentially refers to the ion storage layer 16, the mixed layer 18, and the electrolytic layer 20 of the ECD 10, and a vertical axis refers to the concentrations of the elements that form each layer.

Graph 1 illustrates a concentration change of tantalum (Ta) in each layer, and Graph 2 illustrates a concentration change of tungsten (W) in each layer.

Referring to Graph 1, tantalum (Ta) may be a main constituent element of the electrolytic layer 20, might not be present in the ion storage layer 16, and may have a tendency to gradually increase in a direction from the ion storage layer 16 to the electrolytic layer 20 in the mixed layer 18.

Referring to Graph 2, tungsten (W) may be a main constituent element of the ion storage layer 16, might not be present in the electrolytic layer 20, and may have a tendency to gradually increase in a direction from the electrolytic layer 20 to the ion storage layer 16 in the mixed layer 18. That is, tantalum (Ta) and tungsten (W) may be mixed and distributed in the mixed layer 18 in accordance with an exemplary embodiment as shown in FIG. 5.

The configuration of the ECD 10 in accordance with an exemplary embodiment has been described above.

Next, a configuration of an ECD in accordance with another exemplary embodiment will be described.

Figure 6:
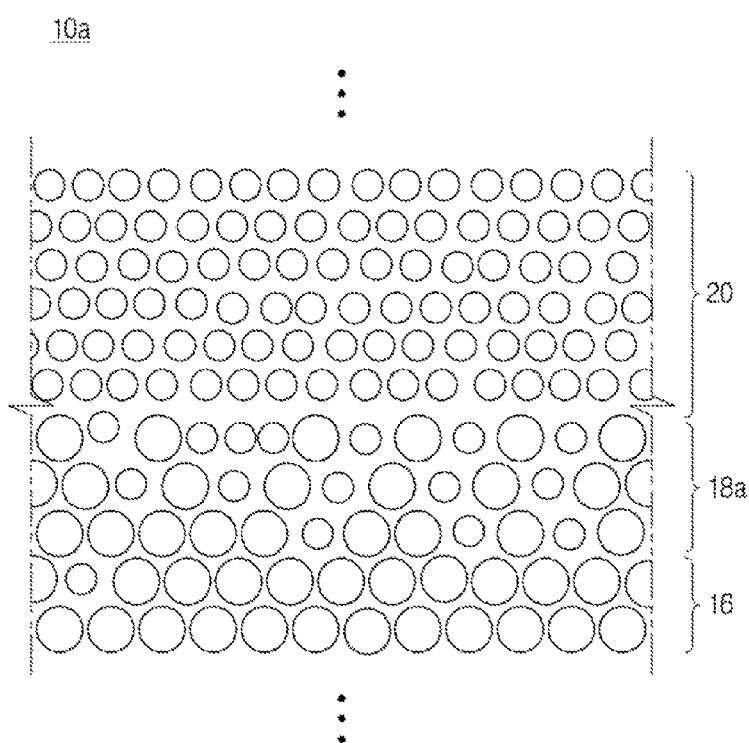
FIG. 6 is a view illustrating a configuration of an electrochromic device including a mixed layer according to an exemplary embodiment.

FIG. 6 is a view illustrating a configuration of the ECD 10a including a mixed layer 18a having a structure different from that shown in FIG. 3.

Referring to FIGS. 3 and 6, the ECD 10a in accordance with an exemplary embodiment may include a substrate 12, an electrode 14 provided on the substrate 12, an ion storage layer 16 provided on the electrode 14, an electrolytic layer 20 provided on the ion storage layer 16, an active layer 22 provided on the electrolytic layer 20, and the mixed layer 18a, which is provided on an interface between the ion storage layer 16 and the electrolytic layer 20 and has a structure in which constituent elements of the ion storage layer 16 and the electrolytic layer 20 are mixed with each other.

The substrate 12, the electrode 14, the ion storage layer 16, the electrolytic layer 20, and the active layer 22 are substantially the same as those shown in FIG. 3, and hereinafter, descriptions given with reference to FIG. 3 will be omitted.

The mixed layer 18a may have a structure in which a constituent element of the electrolytic layer 20 permeates into the ion storage layer 16 unlike FIG. 3. For example, tantalum oxide ($Ta_2O_5$) which is a constituent element of the electrolytic layer 20 may permeate into the ion storage layer 16 including tungsten oxide ($WO_3$) as a main constituent element, and the mixed layer 18a may be formed. In this case, the mixed layer 18a may have tungsten oxide ($WO_3$) as a main constituent element, and may have a structure in which a small amount of tantalum oxide ($Ta_2O_5$) is included therein.

In the ECD 10a in accordance with an exemplary embodiment, since tungsten oxide (WO3) included in the mixed layer 18a is distributed to have density lower than tungsten oxide (WO3) included in the ion storage layer 16 and at the same time tungsten oxide (WO3) is distributed in the mixed layer 18a in addition to the ion storage layer 16, a distribution area of tungsten oxide (WO3) extends.

Therefore, a movement path of hydrogen ions (H⁺) may be ensured, and thus a switching speed of the device may be improved and hydrogen ion (H⁺) storage capability may be improved.

Next, a configuration of an ECD 10b in accordance with another embodiment will be described.

Figure 7:
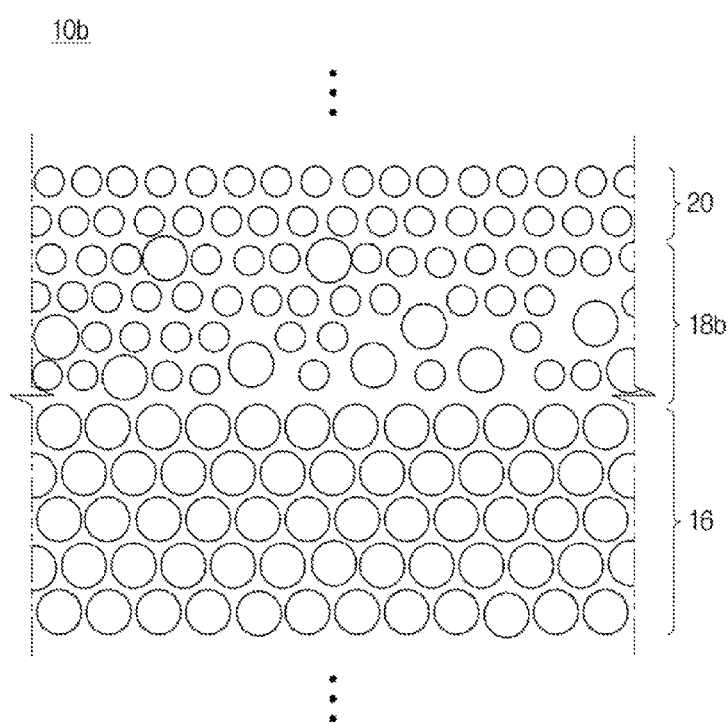
FIG. 7 is a view illustrating a configuration of an electrochromic device including a mixed layer according to an exemplary embodiment.

FIG. 7 is a view illustrating a configuration of the ECD 10b including a mixed layer 18b having a structure different from those shown in FIGS. 3 and 6.

Referring to FIGS. 3 and 7, the ECD 10b in accordance with an exemplary embodiment may include a substrate 12, an electrode 14 provided on the substrate 12, an ion storage layer 16 provided on the electrode 14, an electrolytic layer 20 provided on the ion storage layer 16, an active layer 22 provided on the electrolytic layer 20, and the mixed layer 18b, which is provided on an interface between the ion storage layer 16 and the electrolytic layer 20 and has a structure in which constituent elements of the ion storage layer 16 and the electrolytic layer 20 are mixed with each other.

The substrate 12, the electrode 14, the ion storage layer 16, the electrolytic layer 20, and the active layer 22 are substantially the same as those shown in FIG. 3, and hereinafter, descriptions given with reference to FIG. 3 will be omitted.

The mixed layer 18b may have a structure in which a constituent element of the ion storage layer 16 permeates into the electrolytic layer 20 unlike FIGS. 3 and 6. For example, tungsten oxide ($WO_3$) which is a constituent element of the ion storage layer 16 may permeate into the electrolytic layer 20 including tantalum oxide ($Ta_2O_5$) as a main constituent element and may be formed to the mixed layer 18b. In this case, the mixed layer 18b may have tantalum oxide ($Ta_2O_5$) as a main constituent element, and may have a structure in which a small amount of tungsten oxide ($WO_3$) is included therein.

In the ECD 10b in accordance with an exemplary embodiment, since tungsten oxide ($WO_3$) included in the mixed layer 18b is distributed to have a lower density than tungsten oxide ($WO_3$) included in the ion storage layer 16 and at the same time tungsten oxide ($WO_3$) is distributed in the mixed layer 18b in addition to the ion storage layer 16, a distribution area of tungsten oxide ($WO_3$) extends. Therefore, a movement path of hydrogen ions (H⁺) may be ensured, and thus a switching speed of the device may be improved and hydrogen ion (H⁺) storage capability may be improved. Descriptions given with reference to FIGS. 3 to 6 will be omitted.

The ECD 10, 10a, and 10b in accordance with exemplary embodiments have been described above.

Hereinafter, a method of forming the mixed layer 18 of the ECD 10 configured as described above will be described. The mixed layer 18 of the ECD 10 in accordance with an exemplary embodiment configured as shown in FIGS. 3, 4, 6, and 7 may be formed using a sputtering method or by mixing the sputtering method and an annealing method.

The sputtering method is a representative physical vapor deposition method. More specifically, the sputtering method is a method in which an inert gas is accelerated and collides with a solid sample in a vacuum chamber and atoms going out from the solid sample using energy generated during collision.

The annealing method is a method in which a thermal history that remains in an internal structure of the material and an influence due to a processing are removed by appropriately heating a metal material, and is one of heat treatment methods in which the metal material is heated to a predetermined temperature and is slowly cooled in order to rectify a modification therein. The mixed layer 18 in accordance with an exemplary embodiment may induce diffusion of the material by additionally applying the annealing method after applying the sputtering method.

Hereinafter, a configuration of the sputtering deposition device will be described, and then a process of forming the mixed layer 18 will be described.

Figure 8:
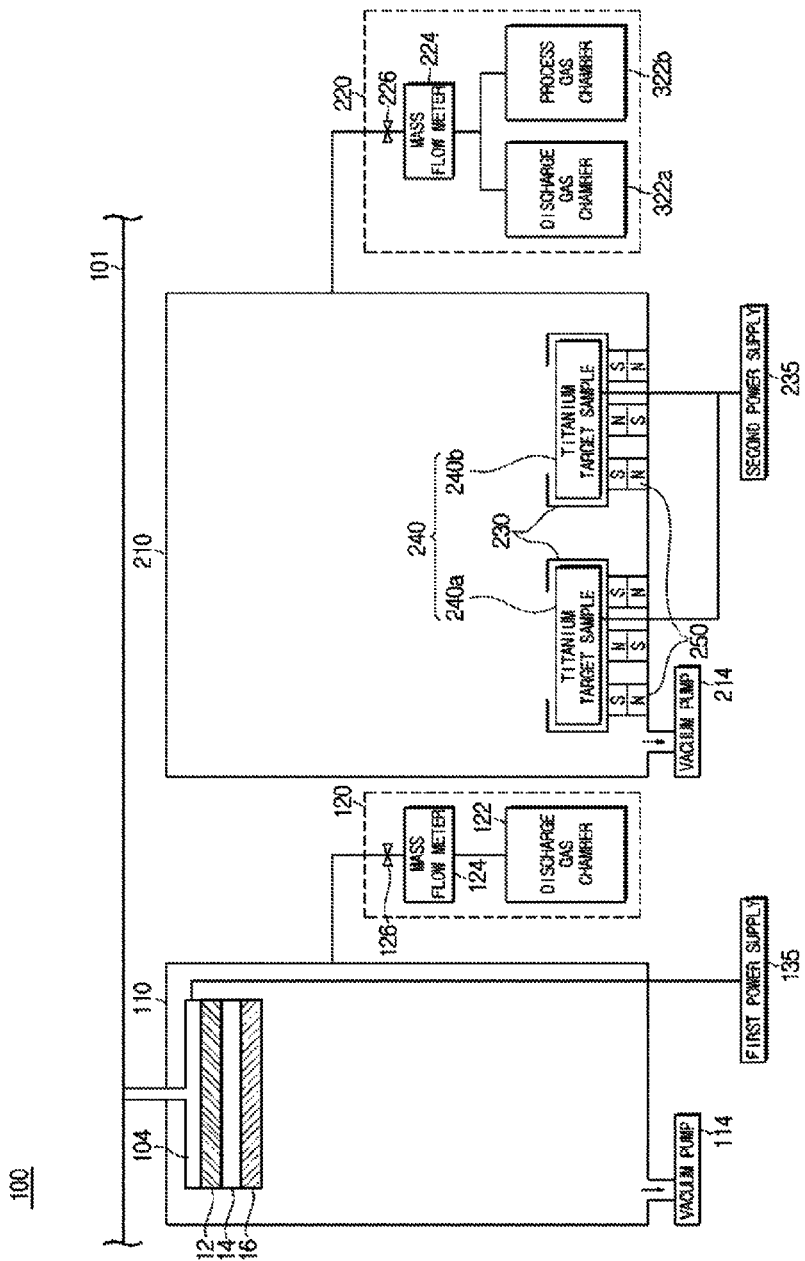
FIG. 8 is a view illustrating an example of a sputtering deposition device according to an exemplary embodiment.

FIG. 8 is a view illustrating an example of a sputtering deposition device 100 in accordance with an exemplary embodiment.

Referring to FIG. 8, the sputtering deposition device 100 may include a first power supply 135, second power supply 235, plurality of vacuum chambers 110 and 210, vacuum pumps 114 and 214, gas supply systems 120 and 220, a rail 101, a gun 230, a target sample 240, and a plurality of magnetrons 250.

The vacuum pumps 114 and 214 are provided on side surfaces of the vacuum chambers 110 and 210, respectively, and maintain vacuum states of the vacuum chambers 110 and 210, respectively.

The gas supply systems 120 and 220 may be provided on side walls of the vacuum chambers 110 and 210, respectively, and may supply gas into the vacuum chambers 110 and 210.

The gas supply systems 120 and 220 may include discharge gas chambers 122 and 322a in which a discharge gas to be ionized is stored, a gas chamber 322b in which an oxygen gas provided as a process gas for plasma chemical deposition is stored, mass flow meters 124 and 224 which connect the vacuum chambers 110 and 210 to the gas chambers 122, 322a, and 322b, and control valves 126 and 226 which control gas flowing from the gas chambers 122, 322a, and 322b to the vacuum chambers 110 and 210.

Argon gas may be stored in the discharge gas chambers 122 and 322a and other inert gases in addition to argon gas may also be stored. As an example, argon gas used as the discharge gas will now be described.

The rail 101 is provided over the vacuum chambers 110 and 210, and moves an object to be deposited. More specifically, the object to be deposited may be fixed to a jig 104 and moved along the rail 101.

In an exemplary embodiment, the object to be deposited may be an ion storage layer 16 or an electrolytic layer 20. Hereinafter, as an example, the ion storage layer 16 which is the object to be deposited will be described.

The gun 230 is provided inside the second vacuum chamber 210. Since the gun 230 is connected to negative electrodes through second power supply 235, negative electric fields are generated and discharging is started when the second power supply 235 supplies power to the gun 230. Thus, argon gas and the power supplied from the second power supply 235 are collided, and then plasma is generated while creating argon ions.

The target sample 240 is provided inside the second vacuum chamber 210 and located opposite to the object to be deposited. The target sample 240 may be provided as a single sample or a plurality of samples depending on a shape of the object to be deposited or a deposition layer to be formed. A case in which a single target sample is provided will be described with reference to FIG. 8.

An example configuration of the sputtering deposition device 100 for forming the mixed layer 18 has been described above.

Next, a process of forming the mixed layer 18 using the sputtering deposition device 100 of FIG. 8 will be described.

The mixed layer 18 shown in FIGS. 3 and 4 may be formed using the ion storage layer 16 or the electrolytic layer 20 as an object to be deposited. That is, after tungsten oxide ($WO_3$) and tantalum oxide ($Ta_2O_5$) are simultaneously deposited on the ion storage layer 16 including tungsten oxide ($WO_3$) as a main component, the electrolytic layer 20 including tantalum oxide ($Ta_2O_5$) as a main component may be formed, and after tungsten oxide ($WO_3$) and tantalum oxide ($Ta_2O_5$) are simultaneously deposited on the electrolytic layer 20 including tantalum oxide ($Ta_2O_5$) as a main component, the ion storage layer 16 including tungsten oxide ($WO_3$) as a main component may be formed. Hereinafter, a case in which the ion storage layer 16 is the object to be deposited will be described by way of example.

A co-sputtering method in which the mixed layer 18 is formed by providing a first target sample 240a including tungsten (W) or tungsten oxide ($WO_3$) and a second target sample 240b including tantalum (Ta) or tantalum oxide ($Ta_2O_5$) may be applied to the process of simultaneously depositing tungsten oxide ($WO_3$) and tantalum oxide ($Ta_2O_5$).

When the first target sample 240a includes tungsten oxide ($WO_3$) or the second target sample 240b includes tantalum oxide ($Ta_2O_5$), tungsten oxide ($WO_3$) or tantalum oxide ($Ta_2O_5$) separated from the target sample may be directly deposited on the ion storage layer 16, and when the first target sample 240a includes tungsten (W) or the second target sample 240b include tantalum (Ta), oxygen gas provided in the gas chamber 322b is supplied and reacts to tungsten (W) or tantalum (Ta), and then may be deposited on the ion storage layer 16.

The mixed layer 18 shown in FIG. 6 may use the ion storage layer 16 as the object to be deposited and may be formed using tantalum (Ta) or tantalum oxide ($Ta_2O_5$) as the target sample, and the mixed layer 18 shown in FIG. 7 may use the electrolytic layer 20 as the object to be deposited and may be formed using tungsten (W) or tungsten oxide ($WO_3$) as the target sample. Detailed description thereof is the same as that of the processes of forming the mixed layers 18 shown in FIGS. 3 and 4. Hereinafter, repeated description thereof will be omitted.

Hereinafter, an operation principle of the ECD 10 formed using the above-described method will be described.

FIGS. 9 to 12 are views illustrating an operating principle of the ECD 10 shown in FIGS. 3 and 4. A case in which the active layer 22, which is composed of alloy of magnesium and nickel ($Mg_2Ni$), the electrolytic layer 20, which is composed of a solid, the ion storage layer 16, which is composed of tungsten oxide ($WO_3$), and the electrode 14, which is composed of an ITO material will be described by way of example with reference to FIGS. 9 to 12.

Figure 9:
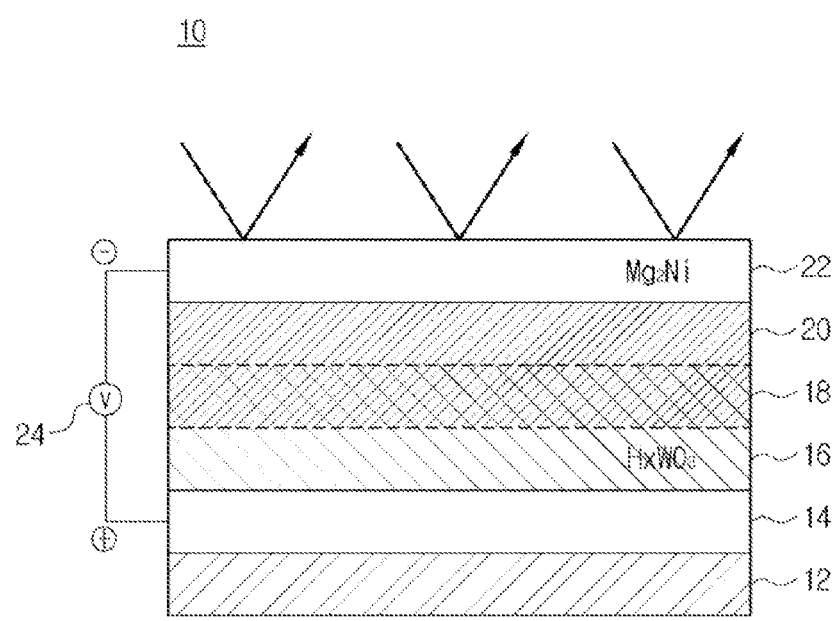
FIGS. 9 to 12 are views illustrating an operation of an electrochromic device of FIGS. 3 and 4.

Referring to FIG. 9, in the ECD 10 in accordance with an exemplary embodiment, the negative electrode of the power supply 24 is connected to the active layer 22, and a positive electrode is connected to the electrode 14. Since the active layer 22 is formed of a metallic material, a separate electrode might not be provided around the active layer 22, and the negative electrode may be directly connected to the active layer 22.

Hydrogen is not permanently stored in the active layer 22. Hydrogen supplied from the ion storage layer 16 is temporarily stored in the active layer 22, and thus a transparent mode or a reflective mode is implemented and an equilibrium state is formed between the active layer 22 and the ion storage layer 16. Thus, the active layer 22 is present in a form of alloy ($Mg_2Ni$) formed of magnesium and nickel, reflects light from a surface, and thus displays an original metallic luster, particularly in reflective mode.

Figure 10:
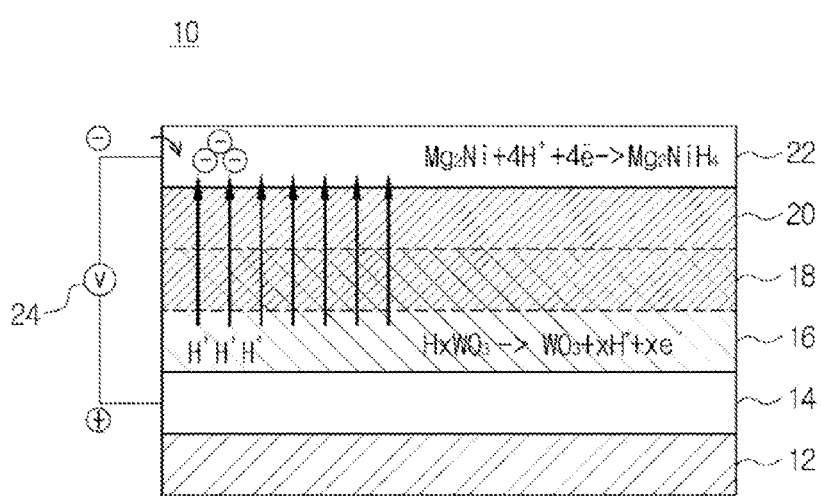

Power is supplied to the ECD 10 and maintains the equilibrium state through the power supply 24. As shown in FIG. 10, when negative potential is provided to the active layer 22 and positive potential is provided to the ITO electrode, electrons flow into the active layer 22. Thus, the active layer 22 is in an electron-rich state, and the ion storage layer 16 is in a state in which a concentration of hydrogen ions ($H^+$) is relatively sufficient.

Because of this, the hydrogen ion ($H^+$) equilibrium state established between the active layer 22 and the ion storage layer 16 is broken, the active layer 22 is in a state which hydrogen ions ($H^+$) are easily contained, and the hydrogen ions ($H^+$) released from the ion storage layer 16 move to the active layer 22 through the mixed layer 18 and the electrolytic layer 20.

In summary, an oxidation reaction (hereinafter referred to as Chemical Reaction Formula 1) is performed in the ion storage layer 16, and a reduction reaction (hereinafter referred to as Chemical Reaction Formula 2) is performed in the active layer 22.

   Chemical Reaction Formula 1

   Chemical Reaction Formula 2

Figure 11:
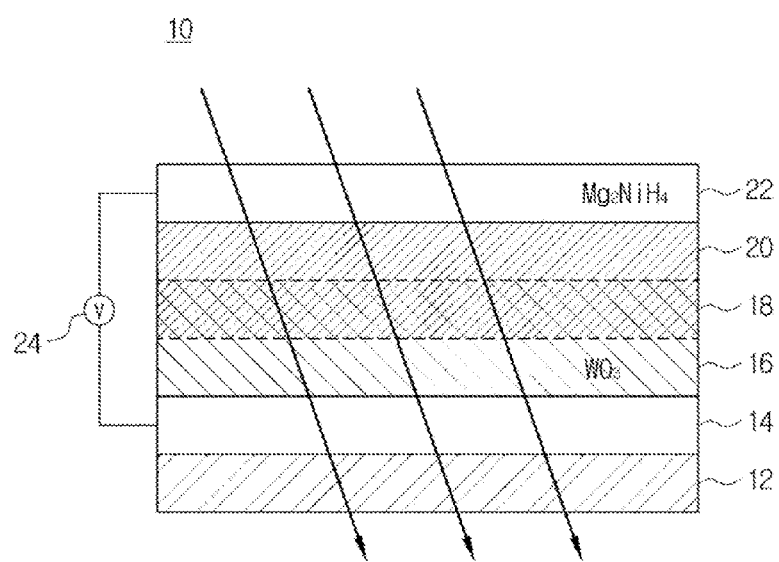

That is, the alloy ($Mg_2Ni$) made of magnesium and nickel of the active layer 22 is coupled to the hydrogen ions ($H^+$), and an optical characteristic is switched to a transmissive state as shown in FIG. 11.

Then, power is supplied through the power supply 24 so that the ECD 10, in which the optical characteristic is switched and remains in an equilibrium state, implements a metal exterior again.

Figure 12:
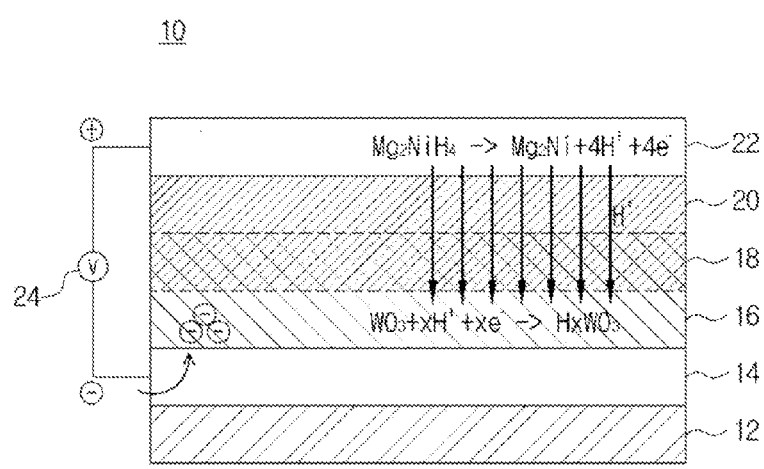

As shown in FIG. 12, when positive potential is granted to the active layer 22 and negative power is granted to the ITO electrode 14, electrons flow into the ion storage layer 16 through the ITO electrode. When the electrons flow into the ion storage layer 16, the ion storage layer 16 is in an electron-rich state, and the active layer 22 is in a state in which a concentration of hydrogen ions ($H^+$) is relatively sufficient.

Therefore, a new hydrogen ion ($H^+$) equilibrium state established between the active layer 22 and the ion storage layer 16 is broken, the ion storage layer 16 is in a state which hydrogen ions ($H^+$) are easily contained, the hydrogen ions ($H^+$) released from the active layer 22 move to the ion storage layer 16 through the electrolytic layer 20 and the mixed layer 18.

In summary, reduction reaction (hereinafter referred to as Chemical Reaction Formula 3) is performed in the ion storage layer 16, and oxidation reaction (hereinafter referred to as Chemical Reaction Formula 4) is performed in the active layer 22.

   Chemical Reaction Formula 3

   Chemical Reaction Formula 4

That is, alloy ($Mg_2Ni$) made of magnesium and nickel of the active layer 22 is in a state in which the hydrogen ions ($H^+$) are insufficient, and thus an optical characteristic is switched to a reflective state as shown in FIG. 9.

In a process of performing a series of reactions such as Chemical Reaction Formulas 1 to 4, transmission in the transparent mode may be improved and a switching speed of the ECD 10 may be increased due to the mixed layer 18.

More specifically, the hydrogen ions ($H^+$) may be stored in an area of the mixed layer 18 as well as the ion storage layer 16. That is, whole hydrogen storage capability of the ECD 10 may be improved due to the mixed layer 18. This means that the amount of the hydrogen ions ($H^+$) that may be coupled to magnesium ions of the mixed layer 18 may be increased in the transparent mode, and thus transmission may be improved.

Further, the mixed layer 18 is a layer in which constituent elements of the electrolytic layer 20 and the ion storage layer 16 are mixed, an energy barrier on an interface between the electrolytic layer 20 and the ion storage layer 16 is lowered, and thus hydrogen ions ($H^+$) between the ion storage layer 16 and the active layer 22 may be easily moved. More specifically, when the constituent element of the ion storage layer 16 and the constituent element of the electrolytic layer 20 are mixed, a distance between atoms is increased, and thus a path, in which hydrogen ions ($H^+$) may move, may be widely ensured. Therefore, an effect in which the energy barrier on the interface between the electrolytic layer 20 and the ion storage layer 16 is lowered is obtained, and thus the switching speed may be increased.

Figure 13:
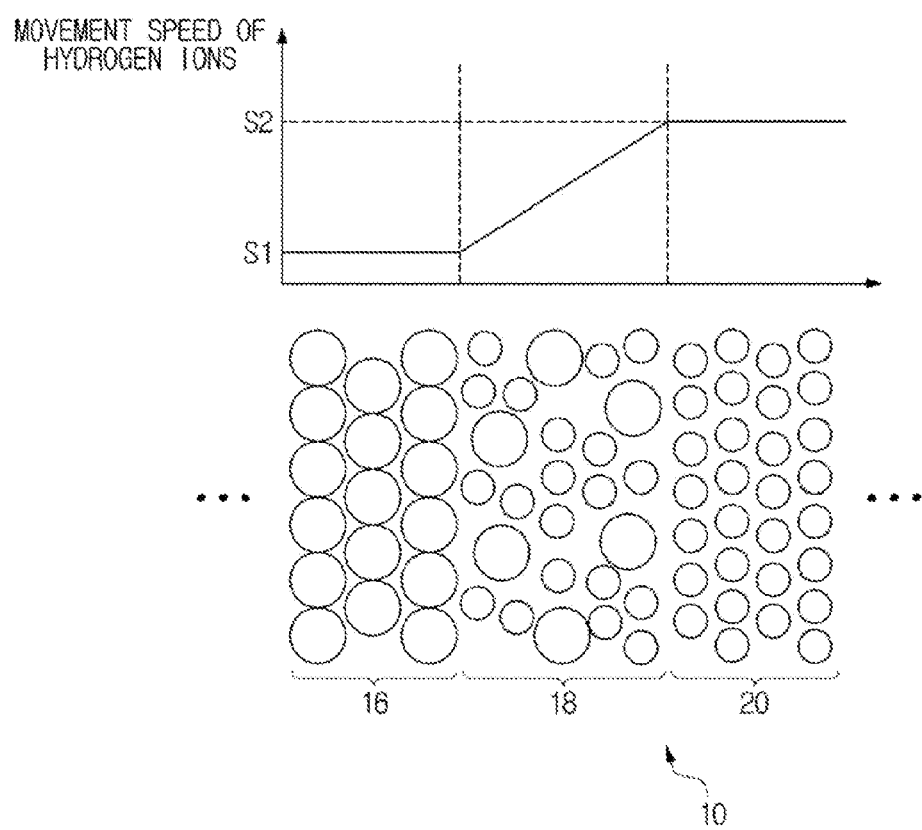
FIG. 13 is a view illustrating a movement speed of hydrogen ion in each layer of an electrochromic device of FIGS. 3 and 4.

FIG. 13 is a view illustrating a movement speed of hydrogen ions ($H^+$) in each layer of the ECD 10 shown in FIGS. 3 and 4. The ECD 10 shown in FIGS. 5 and 6 may also show a movement speed of hydrogen ions ($H^+$) similar to that shown in FIG. 3, and hereinafter, a case in which the movement speed of the hydrogen ions ($H^+$) shown in FIG. 3 will be described by way of example.

A horizontal axis of FIG. 13 sequentially refers to the ion storage layer 16, the mixed layer 18, and the electrolytic layer 20 of the ECD 10, and a vertical axis refers to the movement speed of the hydrogen ions ($H^+$) in each layer.

As shown in FIG. 13, the hydrogen ions ($H^+$) may move at a speed of about S1 in the ion storage layer 16, the speed is gradually increased in a direction from the ion storage layer 16 to the electrolytic layer 20 inside the mixed layer 18, and thus the hydrogen ions ($H^+$) may move at a speed of about S2 in the electrolytic layer 20.

A speed of moving the hydrogen ions ($H^+$) by being decomposed from tungsten oxides with hydrogen ($H_xWO_3$) inside the ion storage layer 16 is affected by density of the ion storage layer 16 and at the same time the speed is affected by the energy barrier formed on the interface between the ion storage layer 16 and the electrolytic layer 20. That is, when the density of the ion storage layer 16 is very high, the movement path of the hydrogen ions ($H^+$) may not be ensured and thus the movement speed of the hydrogen ions ($H^+$) may be reduced in the ion storage layer 16, and when the energy barrier formed on the interface between the ion storage layer 16 and the electrolytic layer 20 is large, the movement speed of the hydrogen ions ($H^+$) may also be reduced.

Since tantalum (Ta) which is a main constituent element of the ion storage layer 16 and tungsten (W) which is a main constituent element of the electrolytic layer 20 are mixed and distributed inside the mixed layer 18, the density of the ion storage layer 16 is reduced, the movement path of the hydrogen ions ($H^+$) is increased on the interface between the ion storage layer 16 and the electrolytic layer 20, and thus the energy barrier may be reduced. Therefore, the hydrogen ions ($H^+$) may quickly move using the mixed layer 18 as a medium, and the switching speed of the ECD 10 may be improved.

According to an electrochromic device configured as described above, the following effects can be expected.

First, since the content of storable protons is increased, transmission of the device can be improved.

Further, since the number of movement paths of the protons inside the ion storage layer is increased, a switching speed of the device can be improved.

From the above-described, the embodiments of the ECD 10 were described. The technical concept of the invention is not limited by the exemplary embodiments described above, and it should be understood that modifications considered by those of skilled in art are possible within the scope of the present disclosure.

What is claimed is:

1. An electrochromic device, comprising:
    an active layer configured to provide a transparent state by a protonation and a reflective state by a deprotonation;
    an ion storage layer configured to store a proton;
    an electrolytic layer provided between the active layer and the ion storage layer and configured to be a medium through which the proton is moved; and
    a mixed layer comprising a constituent element of the ion storage layer and a constituent element of the electrolytic layer.

2. The device according to claim 1, wherein the mixed layer is provided between the ion storage layer and the electrolytic layer.

3. The device according to claim 1, wherein the mixed layer comprises a uniform mix of the constituent elements of the ion storage layer and the electrolytic layer.

4. The device according to claim 1, wherein the mixed layer has a structure in which the constituent element of the ion storage layer permeates into the electrolytic layer.

5. The device according to claim 1, wherein the mixed layer has a structure in which the constituent element of the electrolytic layer permeates into the ion storage layer.

6. The device according to claim 1, wherein the mixed layer is configured to have a thickness in a range between 10 percent and 50 percent of a total thickness of the ion storage layer, the mixed layer, and the electrolytic layer.

7. The device according to claim 1, wherein the mixed layer is formed using at least one method selected from a group consisting of a sputtering method and an annealing method.

8. The device according to claim 1, wherein the active layer comprises a magnesium (Mg) alloy material.

9. The device according to claim 1, wherein the ion storage layer comprises at least one selected from a group consisting of tungsten oxide ($WO_3$), molybdenum oxide ($MoO_3$), vanadium oxide ($V_2O_3$), and titanium oxide ($TiO_2$).

10. The device according to claim 1, wherein the electrolytic layer comprises at least one selected from a group consisting of tantalum oxide ($Ta_2O_5$), zirconium oxide ($ZrO_2$), and niobium oxide ($Nb_2O_5$).

11. The device according to claim 1, wherein the proton comprises at least one selected from a group consisting of hydrogen (H), lithium (Li), and sodium (Na).

12. An electrochromic device, comprising:
    an active layer configured to provide a transparent state by a protonation and a reflective state by a deprotonation;
    an ion storage layer configured to store a proton; and
    an electrolytic layer provided between the active layer and the ion storage layer and configured to be a medium through which the proton is moved,
    wherein the ion storage layer comprises a constituent element of the electrolytic layer or the electrolytic layer comprises a constituent element of the ion storage layer.

13. The device according to claim 12, comprising a structure in which the constituent element of the electrolytic layer permeates into the ion storage layer.

14. The device according to claim 12, comprising a structure in which the constituent element of the ion storage layer permeates into the electrolytic layer.

15. The device according to claim 12, comprising a structure in which the constituent elements of the ion storage layer and the electrolytic layer are uniformly mixed with each other.

16. An electrochromic device comprising:
an electrode;
an active layer composed of an alloy;
an electrolytic layer comprising a first element;
an ion storage layer composed of a transition metal oxide comprising a second element; and
a mixed layer disposed between the active layer and the ion storage layer comprising the first element and the second element,
wherein the electrochromic device switches between a transmissive mode and a reflective according to voltages applied to the active layer and the electrode.

17. The device of claim 16, wherein the mixed layer comprises a higher concentration of the first element than the second element.

18. The device of claim 16, wherein the mixed layer comprises a higher concentration of the second element than the first element.

19. The device of claim 16, wherein the first element comprises tantalum and the second element comprises tungsten.

20. The device of claim 16, wherein the electrolytic layer and the ion storage layer have a substantially same thickness.

* * * * *